Figure 2:
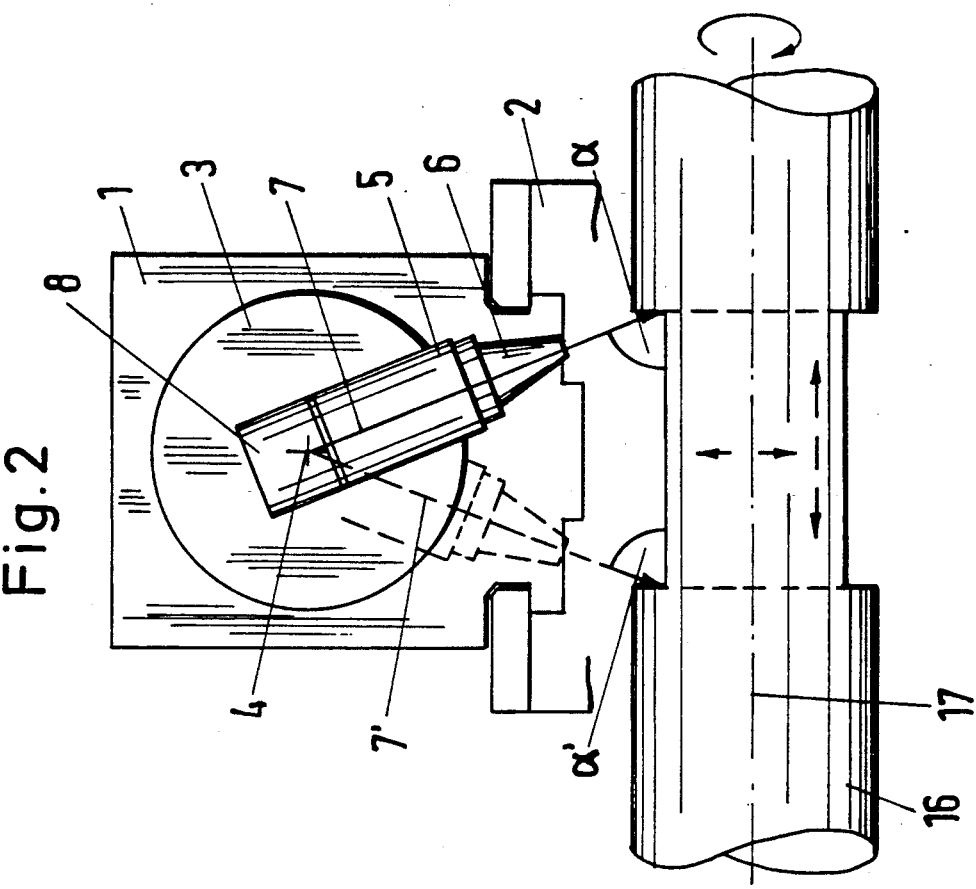

United States Patent [19]

Babel et al.

[11] Patent Number: 5,149,937
[45] Date of Patent: Sep. 22, 1992

[54] PROCESS AND DEVICE FOR THE MANUFACTURE OF CAVITIES IN WORKPIECES THROUGH LASER BEAMS

[75] Inventors: Werner Babel, Pfronten; Peter Grund, Rieden; Gunter Eberl, Waltenhofen/Lanzen; Uli Sutor, Pfronten, all of Fed. Rep. of Germany

[73] Assignee: Maho Aktiengesellschaft, Fed. Rep. of Germany

[21] Appl. No.: 553,077

[22] Filed: Jul. 13, 1990

[30] Foreign Application Priority Data

Jul. 14, 1989 [DE] Fed. Rep. of Germany ....... 3923356
Oct. 2, 1989 [DE] Fed. Rep. of Germany ... 8911733[U]

[51] Int. Cl.$^5$ ............................................. B23K 26/00
[52] U.S. Cl. ........................... 219/121.68; 219/121.78; 219/121.82
[58] Field of Search .................. 219/121.68, 121.69, 219/121.78, 121.8, 121.82

[56] References Cited

U.S. PATENT DOCUMENTS 4,427,872 1/1984 Saunders ..................... 219/121.68
4,866,238 9/1989 Karube ....................... 219/121.78

Primary Examiner—C. L. Albritton
Attorney, Agent, or Firm—Baker, Maxham, Jester & Meador

[57] ABSTRACT

The invention concerns a process and a device for the manufacture of relatively deep cavities in massive workpieces through a laser beam, whereby the material is removed by the laser beam (7) in close guide paths. According to the invention, during each linear ablation process the laser beam (7) deviated vertically is rotated by a predetermined angle while the workpiece (12) is moved back and forth synchronously on a circular path (14) around the rotating axis (4) of the laser beam (7). Upon ablation of a material layer, these linear ablation processes are repeated until the predetermined depth of the cavity has been reached. According to the invention, pocket-like or chamber-like cavities (13) with vertical or undercut walls can be produced with considerable ablation performance in often inappropriae materials such as ceramics, titanium, etc.

10 Claims, 5 Drawing Sheets

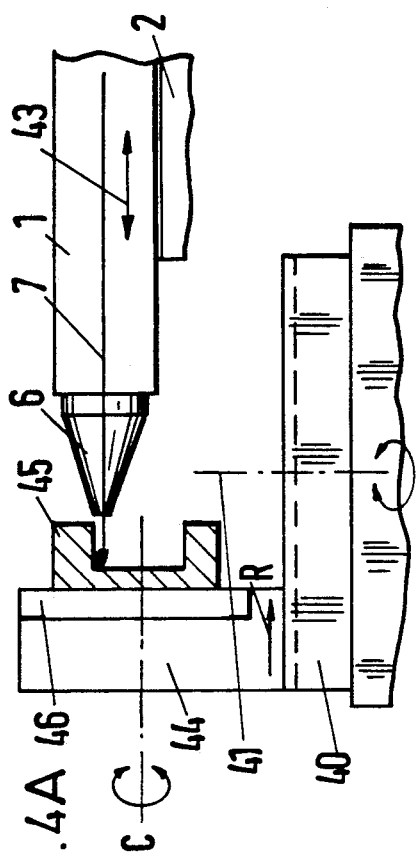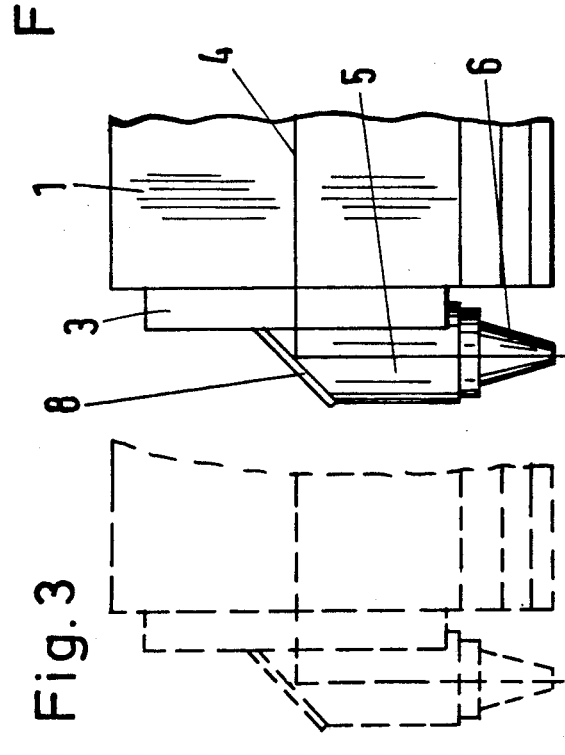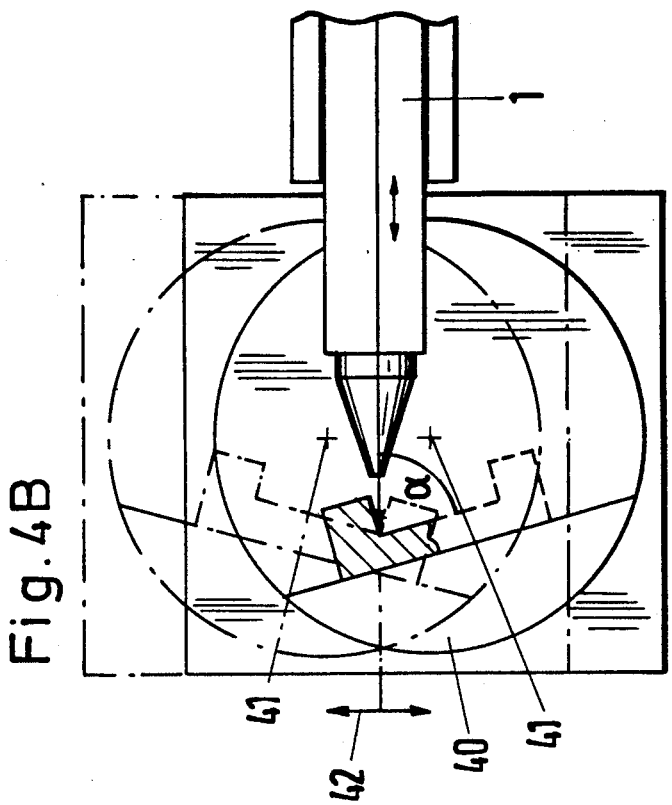

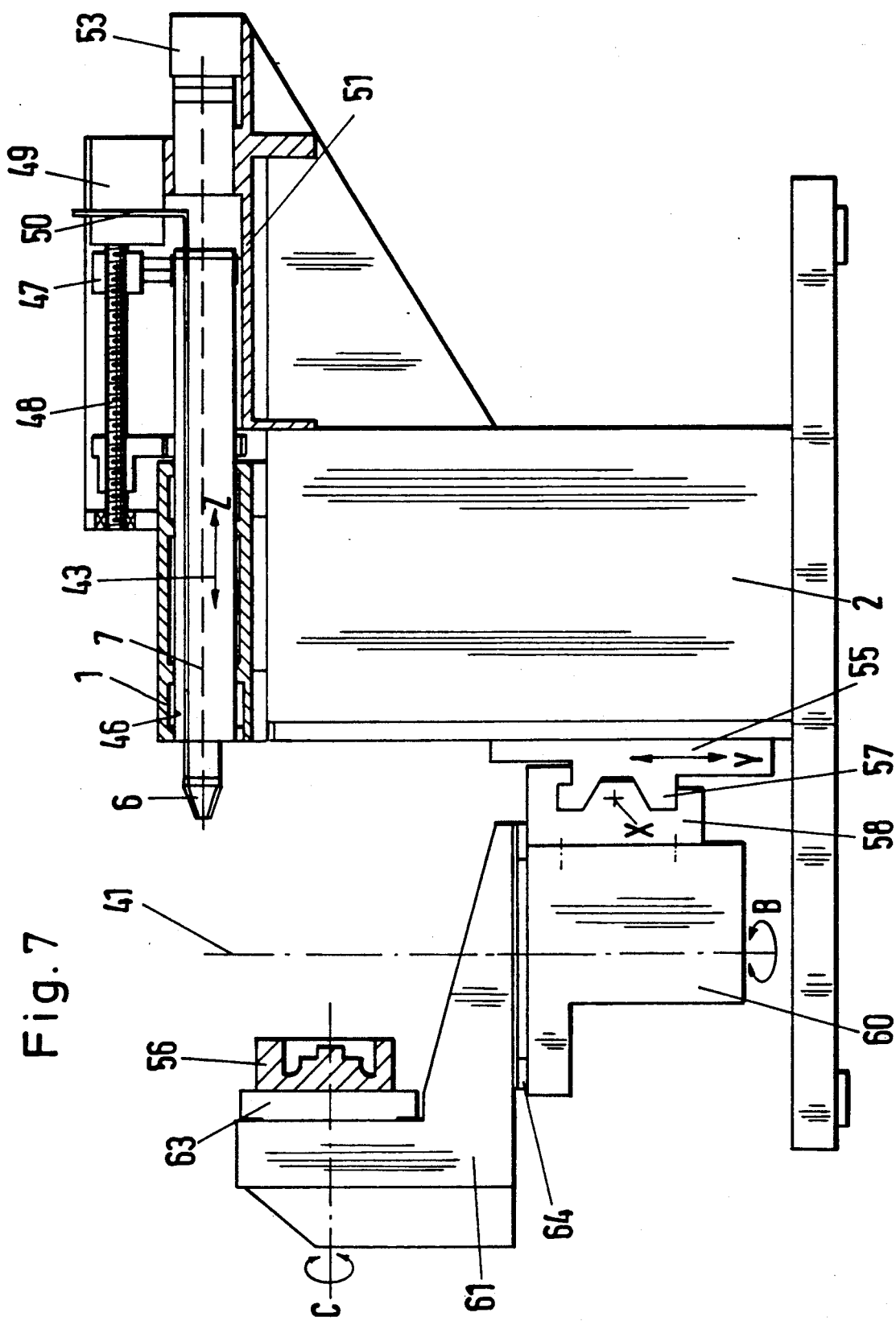

PROCESS AND DEVICE FOR THE MANUFACTURE OF CAVITIES IN WORKPIECES THROUGH LASER BEAMS

The invention concerns processes for the manufacture of cavities in massive workpieces through a laser beam, in which the material is removed by the laser beam through forward and backward feed movements in guideways located adjacent to one another.

In addition, the invention concerns devices for the manufacture of cavities in massive workpieces through a laser beam, featuring a motor-driven movable workpiece table, a laser installation with focus and guide elements for the laser beam and a program control for the laser installation and feed motors of the workpiece table.

Until now, the manufacture of larger pocket and chamber-shaped cavities in massive workpieces, in particular of dies and milling tools, has taken place as a rule through electroerosive and/or chipping material removal of a workpiece clamped on a motor-driven table. With the development of more powerful laser beam systems, their application has been extended to the machining of workpieces.

DE-GM 87 01 354.1 for example describes a process in which two diagonal cuts of opposite slope and crossing each other on one line are introduced into the workpiece. The subsequent introduction of face cuts produces elongated wedge-shaped segments which after removal free prismatic recesses. The elongated bumps which remain between two adjacent recesses are then removed through subsequent similar cut processes with laser beam of opposite slope. It has been shown however that with this process a flat and sufficiently smooth bottom of the recess can not be achieved. In addition, in the area of the crossing cutting lines, resolidifying material may cause welded joints which will prevent the removal of the cut segments.

DE 24 43 334 A1 describes a process and a device for the engraving of surfaces with a laser beam, whereby the laser beam sweeps over the workpiece surface in closely parallel lines and as a result removes the material from the engraving. In a similar process for the manufacture of flat recesses in ceramic workpieces as described in JP-OS 59-47 086 the material is melted by the laser beam travelling back and forth in close paths and is removed through a pressure fluid. However, these known processes do not allow for the manufacture of deeper recesses with vertical or undercut side walls. Indeed, in the area of the side walls there are changes in absorption and reflection conditions for the laser beam (which strikes the workpiece surface vertically) so that the side walls does not run vertical to the workpiece surface but rather tends to run inward. For engraving similar recesses of limited depth such side wall inclinations and also rounded channels in the side wall base are acceptable. However, for deeper recesses such inclined inner walls are often undesirable.

De 35 44 396 A1 describes a process for the manufacture of openings with slanted cutting edges in sheetmetal whereby the workpiece is positioned in a predetermined sharp angle to the longitudinal axis of a laser beam and whereby the continuous opening is cut in the sheetmetal through single or multiple rectilinear scanning.

CH 453 523 describes a laser cutting machine which features a motor-driven oscillating workpiece table, a laser installation with laser source, motor-driven beam guide and focus elements as well as a program control for the laser installation and the feed motors. In order to cut slit-shaped openings, the beam guide elements convert the originally circular section of the laser beam to a rectangular (square) section.

Purpose of the invention is to effect a process for the manufacture of cavities in massive workpieces by means of laser beams with which deeper recesses can be manufactured with side walls which are relatively smooth and which are vertical to the workpiece surface or undercut, and with an even smooth base.

In a first embodiment of the invention, this task is accomplished by rotating the laser beam during each linear ablation cycle at a predetermined angle and at the same time by synchronously moving the workpiece back and forth in a circular curve around the rotating axis of the laser beam, whereby after removal of a material layer these linear ablation processes are repeated layer by layer until the predetermined depth of the cavity has been reached.

Another embodiment of the invention features a laser beam which moves back and forth in a linear fashion during each linear ablation cycle, and a workpiece which at the same time makes synchronous rotating and piston movements, whereby after ablation of a material layer these linear ablation processes are repeated layer by layer until the predetermined depth of the cavity is reached.

A third embodiment features a workpiece which during each linear ablation cycle rotates around a vertical axis in a predetermined angle, and a focal point of the focused laser beam which is shifted synchronously in the horizontal beam axis, whereby after ablation of a material layer these linear ablation processes are repeated layer by layer until the predetermined depth of the cavity is reached.

By combining the various movements of the laser beam and of the workpiece table in accordance with the invention, the laser beam strikes the workpiece under an adjustable angle whereby the position of the work point or focus in the workpiece remains on the same level. The relative slanted position of the laser beam at the end of each linear ablation cycle enables the manufacture of side walls of the recess which are vertical to the workpiece surface or undercut, as well as the achievement of virtually smooth and flat bottom surface of the cavity with distinct sharp angles at the transition to the side walls. Indeed, when the laser beam vertically strikes the workpiece surface at the end of a linear ablation cycle, there occurs an incomplete material ablation in this area as a result of phenomena of partial reflexion or absorption, which leads to side walls which are inclined inward when ablation cycles are repeated to manufacture deeper recesses. These phenomena are prevented due to the relative slope of the impacting laser beam at the end of each linear ablation cycle. In addition, the combination of rotating and linear movements in accordance with the invention produces a uniform relative speed of the laser beam compared to the workpiece, which ensures a constant absorption of the laser beam and the formation of a flat bottom surface. These effects are further supported by a corresponding performance control of the laser installation according to the feed speed of the focal point, for example by a reduction in laser performance in the area of the respective side wall of the recess, i.e. towards the end of each linear ablation cycle, in order to compensate for the unavoidable extension of the focal point's dwell period in this area.

Since the laser beam emerges from a nozzle with at least a pressure fluid, the pressure fluid impacts the workpiece with about the same slope as the laser beam at the end of each work cycle, which effects an increased blowout action for the gaseous and fluid material particles in the critical corner areas. This effect is further enhanced by a targeted slanted supply of the fluid to the focus, whereby this fluid may be a pressure gas, such as air, oxygen or an inert gas and/or also a suitable fluid, suspension or dispersion.

In the first embodiment, the horizontal laser beam is deflected at a reflector to the vertical, and the beam segment impacting the workpiece is deviated by rotating the reflector. This procedure makes it possible to work pocket-shaped and ring-shaped recesses in the solid cylinder and, when continuing these work cycles until the rotation axis of the solid cylinders is horizontal, to trace these with a smooth front wall. From a practical point of view, these procedures are of special significance for special high-tensile materials like ceramics, titanium or compound materials, which canonly be chipped with great difficulty or not at all.

A higher energy yield is offered by the third variant, in which no performance-reducing deflection of the laser beam at a reflector occurs, but in which the laser beam impacts the workpiece horizontally, whereby the latter travels on a track composed of curvilinear and linear movement components.

In order to even out irregularities at the side walls and on the bottom of the recesses, an attractive variant of the invention proposes to rotate the workpiece by 90° around its vertical axis before repeating the layer-by-layer ablation process. The number of repeats of the layer-by-layer ablation process determines the depth of the recess and the surface roughness or smoothness of the bottom, whereby smoothness and flatness of the bottom surface can be further enhanced by controlling other operation parameters such as laser performance, speed of rotation, keying frequency, etc.

In addition, of particular significance for the slope of the side walls of the recess is an effective version of the process in accordance with the invention, in which the angle of slope between the workpiece surface and laser beam is increased at the end of each linear work cycle with increasing depth of the recess, i.e. layer-by-layer ablation cycles, whereby this angle of slope between the laser beam and the workpiece surface at the beginning of the first ablation cycle can be 90° and is only set as desired in further layer-by-layer ablation cycles.

Object of the invention is a device for the manufacture of cavities in a massive workpiece with a laser beam, whereby the device consists of a motor-driven workpiece table which can be moved back and forth, a laser installation with focus and guide elements for the laser beam and a program control for the laser installation and the feed motors of the workpiece table. A motor-driven rotating head which can be rotated around the axis of the horizontal laser beam and which is equipped with integrated reflector is mounted on the front side of a pole whereby the laser beam is deflected 90° in the vertical plane. In this device, the workpiece table is movable in a vertical and horizontal direction on a curvilinear path in order to execute a back-and-forth feed movement.

Another device in accordance with the invention for the manufacture of pocket-shaped or chamber-shaped cavities in a massive workpiece through the use of a laser beam also contains a motor-driven workpiece table which travels back and forth, a laser installation with focus and guidance elements for the laser beam and a program control for the laser system and feed motors of the workpiece table. In this device, the laser system with the focus elements is movable longitudinally and on the rotary workpiece table is mounted a workpiece carrier with vertical gripping surface for a workpiece.

Other embodiments and features are subject of the subclaims.

One of the significant advantages of the invention lies in the fact that workpieces made of the most differing materials with high ablation performance can be worked on the same machine without greater conversion times, which until now has not been possible with any other ablation method. Workpieces of ceramic, glass, high-grade steel, titanium and special alloys for example can be worked just like compound materials such as fiber-strengthened materials, sinter materials and layered molds. Compared with traditional chipping work processes, material ablation with laser beam in accordance with the invention does not produce any ablation forces which are the regular cause of vibrations (chatter) and oscillations in chipping work. In addition, thin-walled webs (passages) of only a few tenths of a milimeter wall strength with vertical or undercut sides can be produced through bilateral ablation. Finally, it is possible to work narrow deep grooves under 1 cmm width for example in complicated workpieces such as turbine blades of ceramic or titanium, which until now were possible only through protracted and burdensome erosion processes.

Further advantages and particulars of the invention are shown in the variant embodiments as illustated in the drawings, and as described in greater detail below.

Figure 1:
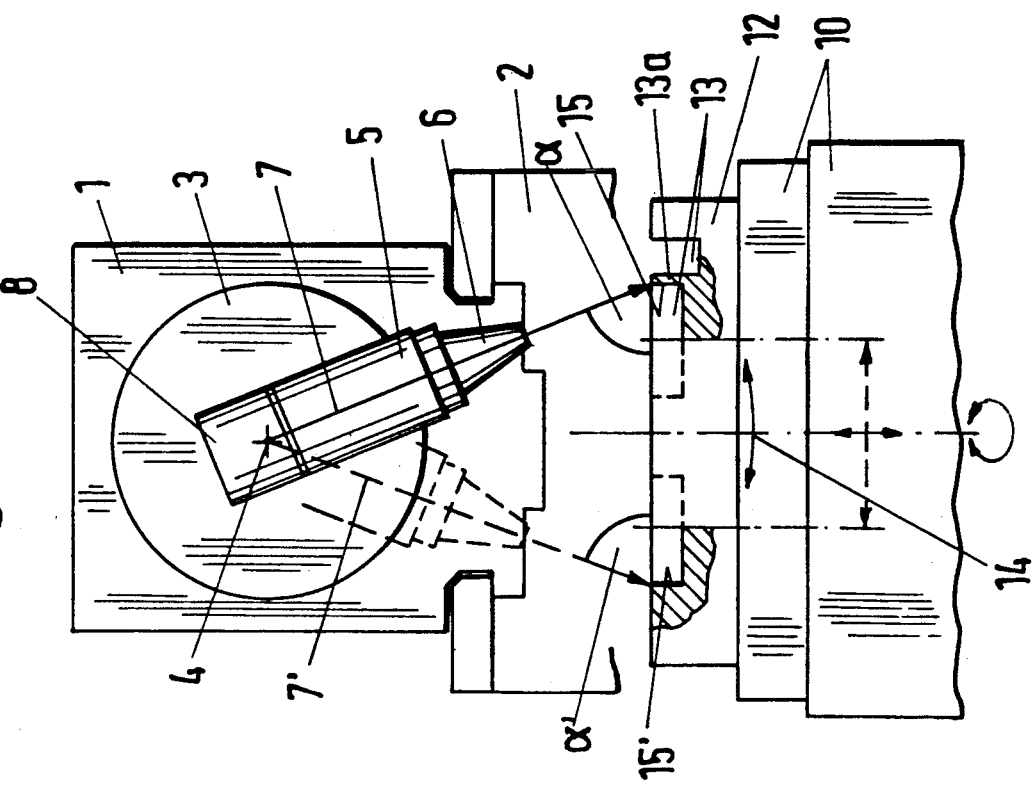

FIG. 1 shows a schematic of the principle of a first ablation process.

Figures 5, 6:
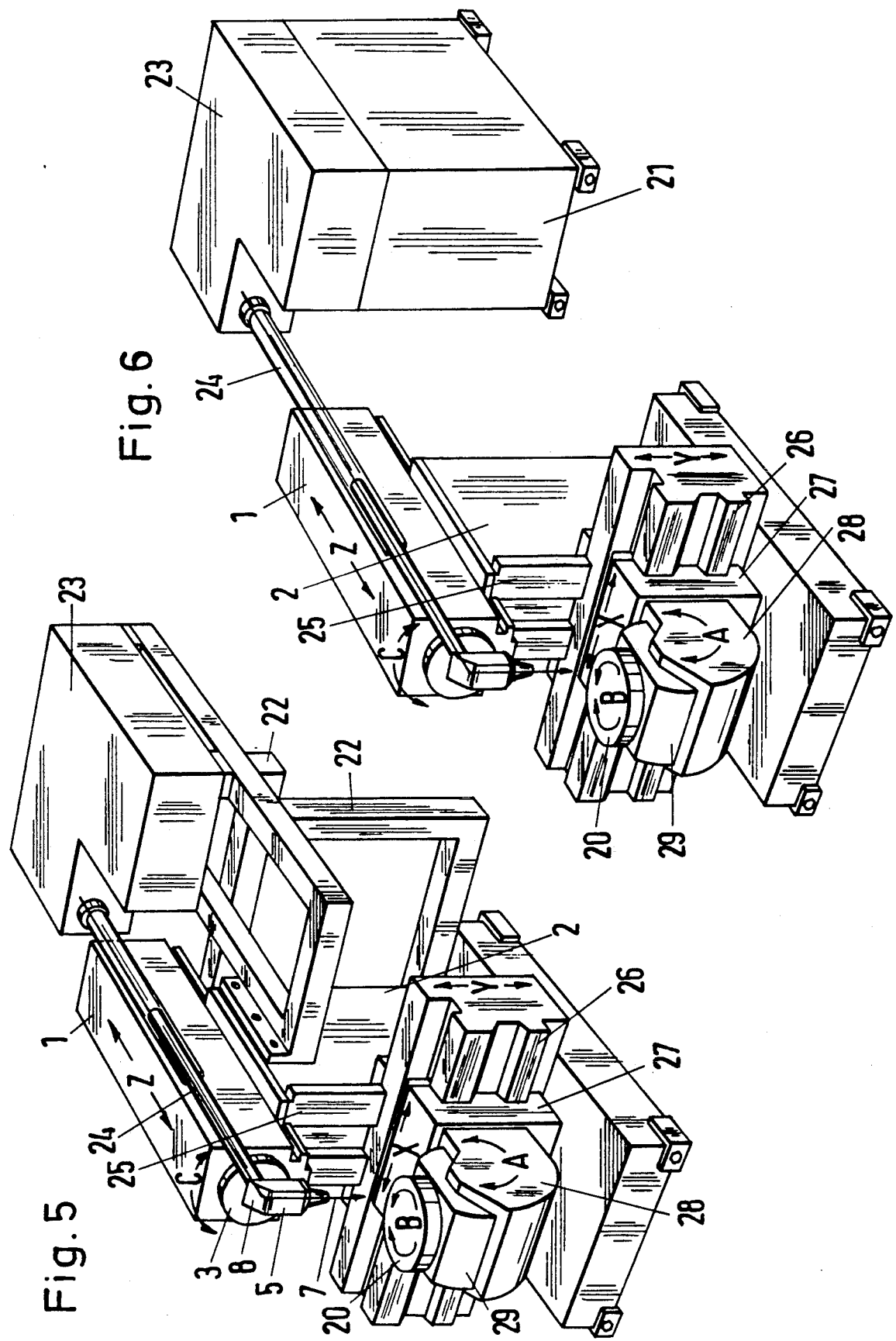
Figure 9:
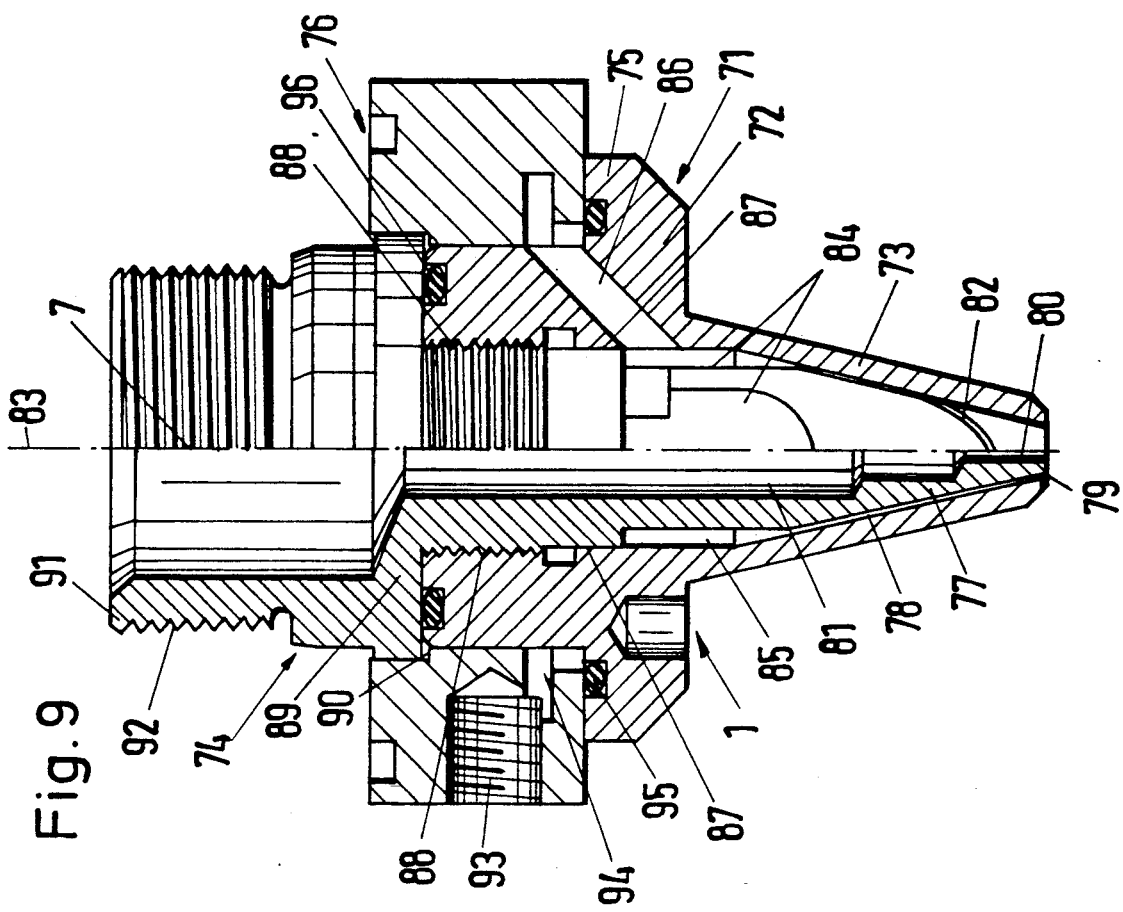
Figure 8:
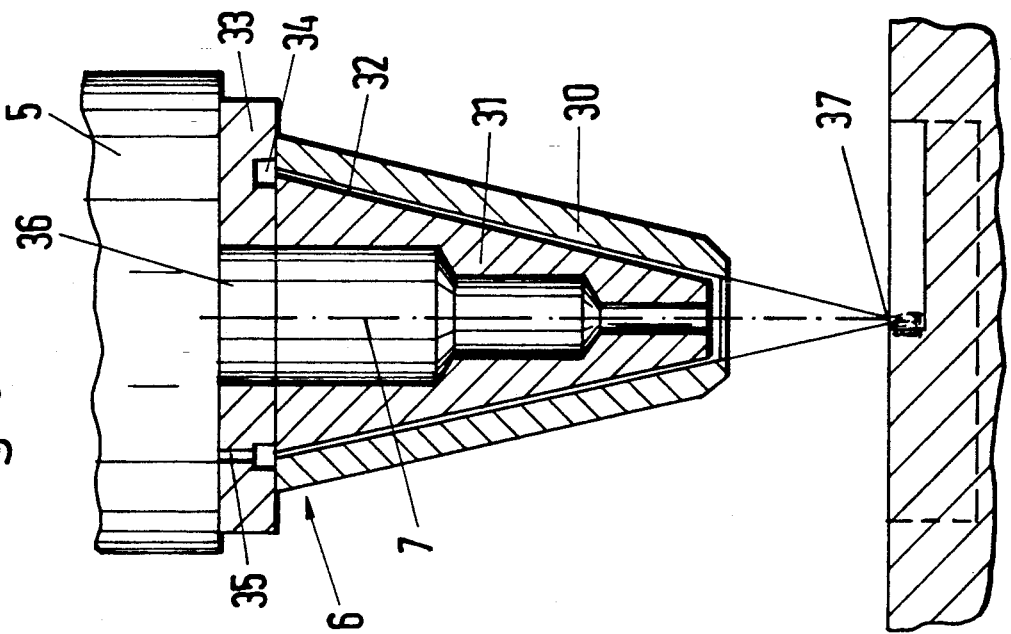

FIG. 2 the application of the principle shown in FIG. 1 to the machining of a cylindrical workpiece FIG. 3 the schgematic of the principle of another ablation process FIG. 4A, 4B a schematic of the principle of another ablation process FIG. 5 a device in accordance with the invention with integrated laser beam installation in perspective FIG. 6 a device with separate laser system FIG. 7 a device with horizontal laser system FIGS. 8,9 two embodiments of the nozzles arranged at the laser head.

FIG. 1 shows the front view of a box-shaped housing 1 which on the flat surface of a machine support 2 is movable vertical to the drawing plane, and which carries on its front side a rotating head 3. The horizontal longitudinal movements of the box-shaped housing 1 and the rotating movements of the rotating head 3 around the axis 4 are produced of electrical motors not shown which are programmed. The rotating head 3 is attached a guiding tube 5 which carries a multichannel nozzle 6 in its lower end. In the box-shaped housing 1, a laser beam 7, 7' marked by arrows runs horizontal in the rotating axis 4 and is defelected in a vertical plane by a slanted (45°) mirror 8 arranged at the upper end of the guide tube 5.

On a workpiece table 10 is clamped a massive workpiece 12, in which are worked two chamber-shaped recesses 13 which define a thin-walled intermediate flange 13a. The workpiece table 10 executes back-and-forth feed movements on a curvilinear path marked by arrow 14 which are synchronized with the rotating movements of the rotating head 3 and of the laser beam 7. This travel path of the workpiece is composed of horizontal and vertical components which the workpiece table executes through combined horizontal and vertical movements. At the end of a linear ablation period, the rotating head 3 with the attached guide tube 5 is in a position marked by a solid line so that the laser beam 7 impacts the surface of the workpiece 12 or the vertical or undercut side wall 15 of the partialy completed recess 13 under a predetermined angle of slope $\alpha$. The workpiece table with clamped workpiece 12 is in this position in its final upper right position. From this final position, the rotating head 3, the laser beam 7 as well as the workpiece table 10 with the clamped workpiece 12 are moved to the left whereby in the middle position the workpiece table 10 is lowered according to its curvilinear travel path and is raised once again by a corresponding amount in the final left position. The speeds of rotation of the laser beam 7 and of the feed movement of the workpiece table 10 are so harmonized that the focus of the laser beam moves with the optimum relative speed which depends on different parameters such as workpiece material. In the final left position in FIG. 1, the laser beam 7', which is also rotated to the left, impacts the workpiece surface or side wall 15' of the recess 13 under the same angle of slope $\alpha'$. If the curve ofside walls 15 and 15' is different (a wall 15 vertical and the other wall 15, undercut), the slopes of angle $\alpha$ and $='$ will also be different.

This procedure makes it possible to produce vertical side walls even in repeated layered ablation of the material in the form of meander-shaped closely adjacent lines, and to avoid ablations in particular at the foot of the side walls. Through the proper selection of the rotating angle $\alpha$, $\alpha'$ of the laser beam 7, undercut side walls can also be produced, as it is often required in mold forms. In order to be able to execute vertically or undercut not only the front walls 15, 15' as shown in FIG. 1 but also both longitudinal walls of recess 13, the workpiece table 10 is rotated around its vertical axis by 90° after linear ablation of a material layer so that the longitudinal walls of the recess run perpendicular to the feed movement. At the same time, the workpiece can be supplied vertically by the thickness of the layer already removed so that focussing of the laser beam and size of the focus are maintained. In order to obtain a smooth flat surface it is important to execute a defocussing of the laser beam in a targeted manner when removing the last material layer, in order to achieve a flattening effect on the bottom surface as a result of the less sharp focussing.

The process variant shown in FIG. 2 shows a solid-cylinder workpiece 16 which is clamped on the front side as is customary in turning machines and which is rotated in cycle around its longitudinal axis 17 whereby rotating angles are selected in such a manner that, the linear ablation paths of the rotating laser beam 7, 7' lie close to one another. For example, when longitudinal or annular grooves with constant depth are to be worked into the cylinder 16, it is moved horizontally and also vertically in the direction of the dotted arrow so that this results in a circular path corresponding to that shown in FIG. 1 and the focus remains on the same level during the rotation of the laser beam. However, if the cylinder is to be cut off (separated across), as shown in dotted lines in FIG. 2, the work can also be done without horizontal or vertical movement of the workpiece. In addition, a similar process with a traditional chipping rotation is also possible in which the workpiece 16 is continuously rotated and the laser beam 7, 7' maintains a fixed set slope in order to form a radial shoulder surface at the workpiece.

The process variant shown in FIG. 3 is distinct from the process in FIG. 1 only in that it uses a motor-driven rotating table 20 which rotates around a horizontal axis 18 and is slidable in the direction of this axis 18, and which is mounted to a vertically movable bracket (see FIG. 5 and 6) like the workpiece table 10 in FIG. 1, and can be rotated around its central axis. In this variant a slanted relative position between the workpiece 12 and the laser beam 7 can be achieved through a feed movement of the housing box 1 with the rotating head 3 mounted to it into the front position as shown by the dotted line and through a synchronized rotating and tilt movement of the workpiece table 20 around the axis 18. As a result, this variant does nor absolutely require a rotating movement of the head 3 around the axis 4, which simplifies the design of the machine.

In the process variant as shown in FIGS. 4A and 4B the workpiece table 40 can be rotated around the vertical axis 41 and can be moved back and forth horizontally in the direction of the arrow. A box-shaped housing 1 features a nozzle 6 at its front end through which the laser beam 7 passes without deflection. The housing 1 is placed on a machine stand 2 and can be moved back and forth in the direction of the arrow 43. A workpiece support 44 on whose vertical clamp surface 46 movable around its central axis is attached a workpiece 45, is mounted upright to the workpiece table 40. FIG. 4B shows a top view of the course of a linear ablation cycle. With each linear ablation cycle the workpiece table is moved around the vertical axis 41 from the lower position shown in solid line to the upper position shown in dotted line whereby a horizontal feed movement in the direction of the arrow 42 is coupled to the rotating movement around the vertical axis 41. In order to compensate for the changing distances between the bottom of the reces 13 in the workpiece and the front end of the nozzle 6 as a result of the curvilinear travel path, the housing box 1 together with the integrated focus and guidance elements executes short-stroke synchronous movements in the direction of the arrow 43. In addition, the supply movement upon completion of a layered ablation cycle also occurs through a linear movement of the housing box 1 in the direction of the arrow 43.

FIG. 5 shows a machine tool for the laser milling of chamber-like cavities in workpieces in which a known $CO_2$ laser beam system 23 is mounted to the machine mount 2 via an appropriate support 24. A telescopic tube 24 arranged centrally in the housing box 1 guides the horizontal laser beam 7. The rotating head 3 mounted to the front side of the housing box 1 can be rotated in the direction of the double arrow C together with the box-shaped nozzle holder 5. A bracket can be moved vertically in the direction of the double arrow Y on front-side vertical guides 25 of the mount 2 and features horizontal guides 26 on its front side for the support of a slide 27 which can be moved in the direction of the double arrow X. On the front side of this slide 27 is a cradle 28 which contains a table bracket 29 which can be turned in the direction of the double arrow A. The workpiece table 10 is arranged on the upper side of this bracket 29 and can be rotated around its vertical axis in the direction of the double arrow B. Individual movements of the various components are executed by electrical motors (not shown) through known means of transmission whose operation is program-controlled.

The device shown in FIG. 6 corresponds in essence to the version shown in FIG. 5 except for the separate laser beam system 23 which is mounted on its own support 21.

The machines as shown in FIG. 5 and 6 have been designed to execute the process variants as shown in FIGS. 1 to 3.

The machine shown in FIG. 7 has been designed to execute the process variant in accordance with FIGS. 4A and 4B and features a box-shaped housing 1 affixed on the machine support 2 and in which a guide tube 46 for the laser beam 7 can be moved longitudinally in the direction of the arrow 43. At the front end of the guide tube 46 is a nozzle 6 and at the rear end engages the nut 47 of a screw spindle 48 which is driven by a motor 49 to execute the linear movements 43. A duct 50 containing a pressure fluid extends in the guide tube up to the nozzle 6. The laser system 53 is mounted to a support structure 51 attached to the rear of the bracket.

On the front of the machine bracket is a motor-driven slide 55 which can be moved vertically in the direction of the double arrow Y and which features on the outside guide tracks 57 for the horizontal displacement of a table clamp 58 in the X axis. To this clamp 58 is attached the lower portion 60 of a rotating table 61 which is designed as a single angular component and whose vertical clamping plate 63 rotatable around the central axis C is in rough alignment with the outer edge of the rotating guide 64. In contrast with the table versions in accordance with FIGS. 4A, 4B, the vertical clamping plate 63 for the workpiece 56 shown as completed cannot be moved horizontally on the lower table portion 60 or the rotating guide 64. As shown in FIG. 7, even complex recesses as well as massive molds can be ablated from a massive blank through the linear layer-by-layer material ablation.

FIGS. 8, 9 show two variants of nozzles 6 whose compact design and small cross-sectional dimensions allow for a separate supply of different fluids to the focus of the laser beam 7. The nozzle in accordance with FIG. 8 contains a cone-shaped outer liner 30 which incorporates a core 31 and forms a narrow channel 32. This channel 32 may have a continuously conic shape or there may be a series of similar individual channels. On the flat upper side of the liner 30 and of the core 31 is an intermediate piece 33 with a ring channel 34 which connects with the upper inlet opening of the conic channel 32. This ring channel 34 is filled with a high-pressure gas such as compressed air at 3 to 10 bar via a nipple 35. In the core 31 is a central multigraduated passage hole 36 which surrounds the central laser beam and which is used for the coaxial supply of an auxiliary gas to the point of impact or focus 37 of the laser beam.

The nozzle variant as shown in detail in FIG. 9 features a housing 71 with a widened middle section 72 and a conical nozzle tip 73 which houses a roughly hollow-cylinder recessed insert 74. This insert 74 is shown in its axial section in the left portion of the drawing and in its side view in the right portion. The middle widened section 72 of the housing 71 contains a radial flange 75 as support for a ring 76. In the conical nozzle tip of the housing 71 is the end portion 77 of the insert 74 whose conic outside wall together with the conic inner wall of the nozzle tip 73 define a continuously conic flow channel 78 which discharges at the end of the nozzle tip in a discharge outlet 79 designed as a ring slot. This discharge outlet 79 surrounds concentrically an inner central discharge outlet 80 at the end of the flow channel 81 extending through the entire casing-shaped insert 74 for an oxidation gas in particular oxygen, and in whose longitudinal axis the laser beam 7 runs. As shown in the right portion of the insert 74, its conic outer surface can at least contain a spiral slot 82 in order to give a rotation movement around the longitudinal axis 83 to the pressure gas, preferably compressed air, flowing in the flow channel 78.

Above the conic section 77, the insert 74 features a square section formed by four flat axis-parallel surfaces 84, which together with the housing inner wall define a distributor chamber 85. In the middle widened portion 72 of the housing 71 are four slanted cross bores 86 at an angle to one another which, facing each of the flat surfaces 84, discharge into the distributor chamber 85.

The square section of insert 74 changes into a cylindrical centering section 87 which is followed by a threaded section 88. With both of these sections 87, 88, the insert 74 is axially centered in the inside of the housing 71 and can be moved vertically. To the threaded section 88 of the insert 74 is connected a connector 91 with external thread 92 via a widening intermediate piece 89 with a fixing shoulder 90 for the ring 76. This stable connector 91 ensures a solid connection of the nozzle head to the mobile guiding elements of the laser beam, and at the same time to the oxygen supply.

As shown in FIG. 9, the ring 76 features a radial taphole 93 into which can be screwed a connecting fitting—not shown—for the supply of compressed air. This taphole 93 exits in an inner ring channel 94 which communicates with the cross bores 86 in the housing 72. In the upper supporting surface of the flange 75 is an annular slot for accomodating an O-sealing ring 95 which seals the housing against the ring. Another O-sealing ring 96 is in an annular slot in the upper front surface of the housing section 72 for sealing against the intermediate piece 89 of insert 74.

The separate supply of oxygen in the axial flow channel 81 and of compressed air in the conic flow channel 78 in the above-described nozzle make possible an intensive mixture of both gases after their exit from the respective openings 79, 80, whereby the gauge and flow cross-section of this conic flow channel can be finetuned by screwing in more or less deep the thread section 88 of insert 74. In this manner, the composition of the mixture and the kinetic energy of the pressure gas beam can be adjusted according to operating conditions, in particular the properties of the various workpiece materials.

The invention is not limited to the process or device variants shown or described above. To the contrary, individual components of one device variant can be combined with those of another device variant in order to execute particular processing tasks.

Compared to the variants in accordance with FIGS. 5 and 6, the processing machine shown in FIG. 7 offers the advantage of a simplified and lighter design, whereby the guide tube including its feed drive as well as the nozzle can be made compact, which enhances access to the workpiece as well as the visual monitoring of the machining processes. The fluid supply lines which extend over the entire length of the guide tube in the form of one or more longitudinal ducts, which communicate with outside sources and which are integrated in the guide tube, operate along the same lines. Since the workpiece 45 can be mounted horizontally together with the carrier 44, 46 so that it is movable in the direction of the arrow R on the rotating table 40 in accordance with the process shown in FIGS. 4A, 4B, there occur smaller horizontal movements of the workpiece 45 in the direction of the arrow in order to compensate for the changes in distance as a result of the relative slanted position of the laser beam 7 to the workpiece 45. The machining point or focus can be advanced closely to the vertical axis 41 so that relatively short distances in the direction of arrow 42 need to be traveled in order to compensate for a "shift in length" as a result of a rotation of the table. This is a significant advantage of the horizontal laser beam whose section impacting on the workpiece does not need to be rotated synchronously with the table movement. Another advantage of the machine in accordance with FIG. 7, i.e. of the horizontal orientation of the laser beam lies in a safety aspect against an unintentional exit of the high-energy laser beam into the environment. Since machines of this kind are in principle equipped with protective compartments, a heat-sensitive safety plate can be installed into the compartment wall facing the laser beam, which is activated and sufts the machine down if the high-energy laser beam exits. Compared to the variants in accordance with FIGS. 5 and 6, this safety aspect is of considerable significance because in the latter variants appropriate safety-wall elements would have to be installed in virtually the entire inner area of a protective compartment. Finally, the variant according to FIG. 7 is also more advantageous in that it allows for a significantly greater performance yield than in variants with reflectors 8. For example, a laser of 750 W can be used for the same ablation performance as a laser with 150 W and multiple deflection by reflection.

The processes to manufacture relatively deep cavities in materials which are otherwise very difficult to work can be developed even further in various ways. It is possible for example to spray a solid-gas or solid-fluid suspension under relatively high pressure to the machining point instead of a pressure gas, in order to remove the molten material through the heat-resistant solid particles in the suspension like "sandblasting" and, as a result, to increase the ablation capability. In addition, through the addition of appropriate chemicals to the suspensions and fluids or gases predetermined alloy effects can be achieved in the surface-close areas of the cavity walls.

In order to be able to carry out the automatic execution of various processing cycles on one or more workpieces it is possible to have a detachable connection of the nozzles to the laser head in order to be able to exchange nozzles through an appropriate exchange device and to execute various jobs like laser cutting, laser welding, laser milling, etc.

The process in accordance with the invention also allows for the manufacture of spherical components with a series of close pocket-shaped recesses of ceramics, titanium or such, as used in medicine as joint or bone substitutes. The formation of this series of pocket-shaped relatively deep cavities with undercut walls makes it possible for the bone subatance to grow into this cavity of an inserted implant, thus producing a very solid connection between the bone and the implant. In addition to these special applications, the process in accordance with the invention is also suitable for the ablation of quartz glass, in particular for the manufacture of large telescopes which are composed of a number of fine-worked individual segments. Finally, also three-dimensional can be produced from masive blanks through the layer-by-layer radial ablation of the material whereby an Nd-YAG laser without pressure fluid should be used.

The relative angle of slope between the laser beam and the workpiece or its surface should be increased layer by layer, whereby this angle may be very small or zero during the first ablation layer and increases to 20° to the vertical with 50 layers removed. The increase of this angle need not be linear in stages but may also follow a straight line or curve. In order to achieve optimum ablation, process parameters are changed layer by layer with an initial maximum material ablation followed by fine-machining and finally by a fine-layer effect. When finally angular recesses are to be manufactured, the entire contour is traveled once more at the end of the process in order to remove any arc-shaped transition which may have formed on the bottom and to obtain a sharp angle between bottom surface and the side walls.

We claim:

1. A laser beam milling apparatus, comprising:
   a machine support;
   a housing slideably mounted on said machine support;
   a laser installation disposed in said housing that includes focusing and guide elements configured to produce a laser beam output along a first beam axis;
   a motor driven rotatable head including a beam deflector mounted on said housing for rotation around said first beam axis, said beam deflector being positioned to receive said laser beam along said first beam axis and to deflect said beam along a second beam axis;
   a motor driven slideable workpiece table positionable in a vertical and horizontal direction along a curvilinear path that crosses said second beam axis such that said laser beam may be directed to a workpiece mounted on said workpiece table in a back and forth feed motion; and
   a program control system for controlling said laser installation, said rotatable head and said workpiece table.

2. The apparatus of claim 1, wherein said motor-driven workpiece table is rotatable within predetermined limits around a horizontal axis parallel to a portion of said curvilinear path and back and forth feed motion.

3. The apparatus of claim 1 wherein said rotating head is mounted to a front side of said housing, and said housing is mounted for horizontal movement on said machine support.

4. A laser beam milling apparatus, comprising:
   a laser installation including a longitudinally positionable guide with focusing elements and a nozzle configured to produce a laser beam output along a first beam path in a longitudinal direction;
   a rotatable, motor driven workpiece table;
   a workpiece support including a vertical clamping surface for supporting a workpiece, said workpiece support being mounted on said workpiece table for positioning through the longitudinal path of said laser beam; and a program control system for controlling said laser installation and said workpiece support.

5. The apparatus of claim 4, wherein said workpiece support is rotatably positionable with respect to said workpiece table.

6. The apparatus of claim 4, wherein said workpiece support is horizontally positionable with respect to said rotatable table.

7. The apparatus of claim 1, further including a machine support and a support structure, and wherein said laser installation is mounted to said machine support through said support structure.

8. The apparatus of claim 1, wherein said rotatable head includes a solid-cylinder support mounted thereto, said solid-cylinder support having a nozzle that includes a cone-shaped outer liner and a conic core, at least one fluid duct between the cone-shaped outer liner and conic core, and a central graduated passage providing an output for the laser beam and for a supplementary auxiliary gas.

9. The apparatus of claim 1 or 4, wherein said laser installation includes a housing having a conical mouthpiece and a conical insert positioned together to define a conical flow channel for a pressure gas, and wherein said conical insert includes an interior axial flow channel narrowing towards an exit thereof at an outlet portion of the laser installation for a pressure fluid, said conical channel terminating at the annular exit that surrounds said axial flow channel exit.

10. The apparatus of claim 9, wherein said conical insert is adjustably positionable with respect to said nozzle mouthpiece section for effecting a change in flow characteristics of said conical flow channel.

* * * * *